United States Patent [19]

Smith

[11] Patent Number: 4,984,776
[45] Date of Patent: Jan. 15, 1991

[54] END ATTACHMENT ASSEMBLY FOR A TWISTED ROPE TORSION BAR

[75] Inventor: Jack E. Smith, Dayton, Ohio

[73] Assignee: General Motors Corporation, Detroit, Mich.

[21] Appl. No.: 390,301

[22] Filed: Aug. 7, 1989

[51] Int. Cl.$^5$ .............................................. F16F 1/16
[52] U.S. Cl. .................................. 267/276; 24/114.5; 74/502.6; 267/149; 267/154; 403/221; 403/225; 403/351; 464/89; 464/97; 464/158
[58] Field of Search .............. 267/279, 276, 273, 148, 267/149, 154; 24/114.5; 403/225, 221, 350, 351; 464/89, 97, 158; 74/502.6

[56] References Cited

U.S. PATENT DOCUMENTS

| | | | |
|---|---|---|---|
| 1,643,110 | 9/1927 | Briggs | 24/114.5 |
| 2,235,605 | 3/1941 | Bugatti | 267/279 X |
| 4,667,530 | 5/1987 | Mettler et al. | 403/225 X |
| 4,781,364 | 11/1988 | Finn et al. | 267/279 X |

FOREIGN PATENT DOCUMENTS

| | | | |
|---|---|---|---|
| 311483 | 4/1989 | European Pat. Off. | 267/273 |
| 2237516 | 2/1974 | Fed. Rep. of Germany | 267/154 |
| 191116 | 9/1937 | Switzerland | 267/279 |
| 485077 | 5/1938 | United Kingdom | 267/276 |

Primary Examiner—George E. A. Halvosa
Attorney, Agent, or Firm—R. L. Phillips

[57] ABSTRACT

An end attachment assembly for a twisted rope torsion bar includes an anchor nut and an internal elastomeric bushing cooperatively mating with the nut. The elastomeric bushing is molded onto the end of the twisted rope torsion bar. The torsion bar is fabricated of a lightweight glass fiber/epoxy composite material. The elastomeric bushing has external splines cooperating and mating with splines on the inner bore of the anchor nut. The end attachment assembly compresses the end of the twisted rope torsion bar to reduce stress concentration and prevent separation, i.e. the application of torque to the anchor nut transmits a like amount of torque to the elastomeric bushing to compress and more firmly grip the twisted rope torsion bar. The elastomeric bushing is compressed radially inwardly by the cam shape of the mating splines. Advantageously, the elastomeric bushing proportionally increases the grip on the end of the torsion bar so that the joint is made tighter and tighter under increased torque.

3 Claims, 2 Drawing Sheets

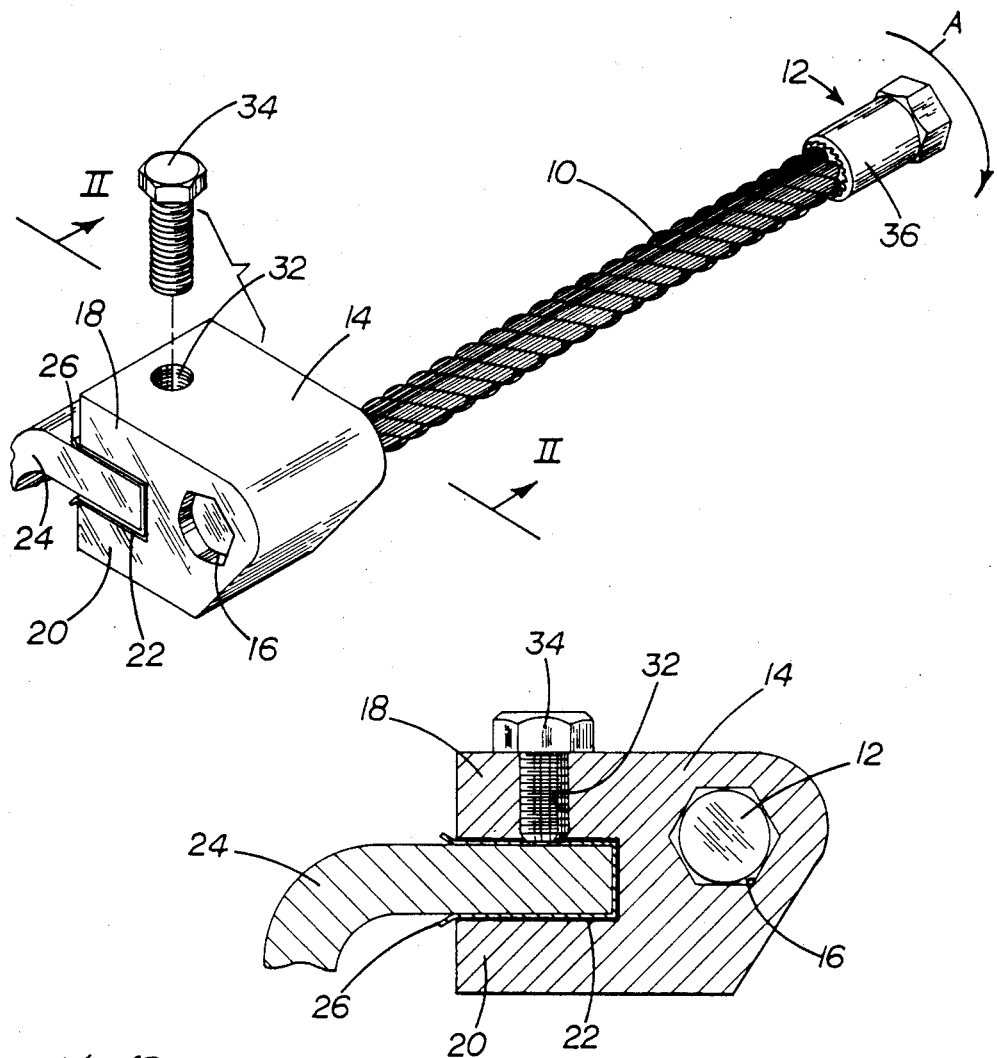

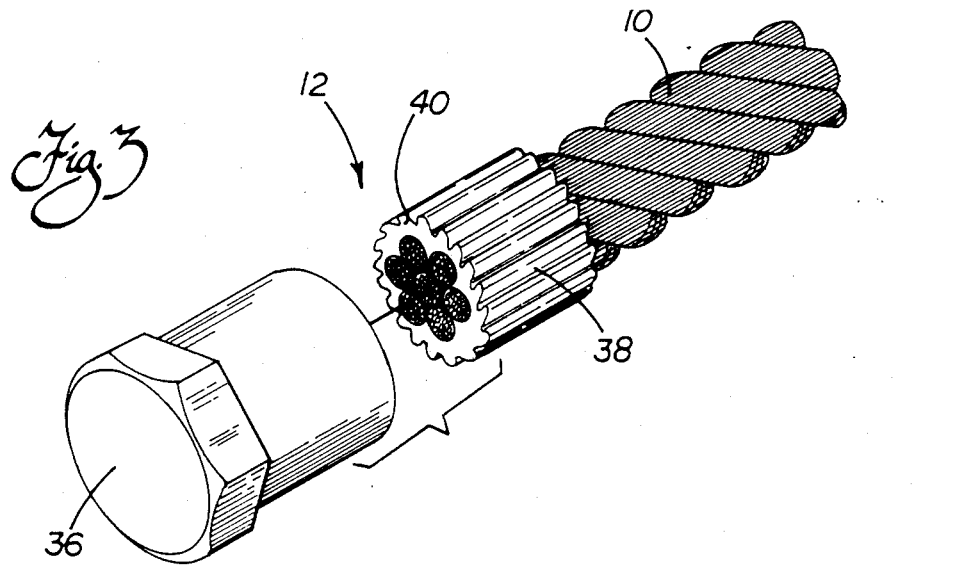
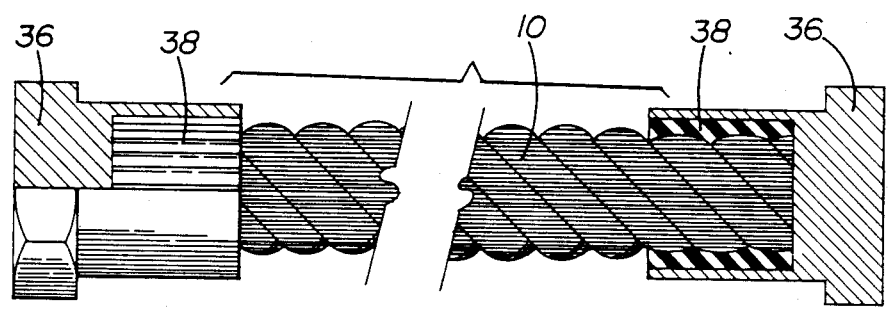
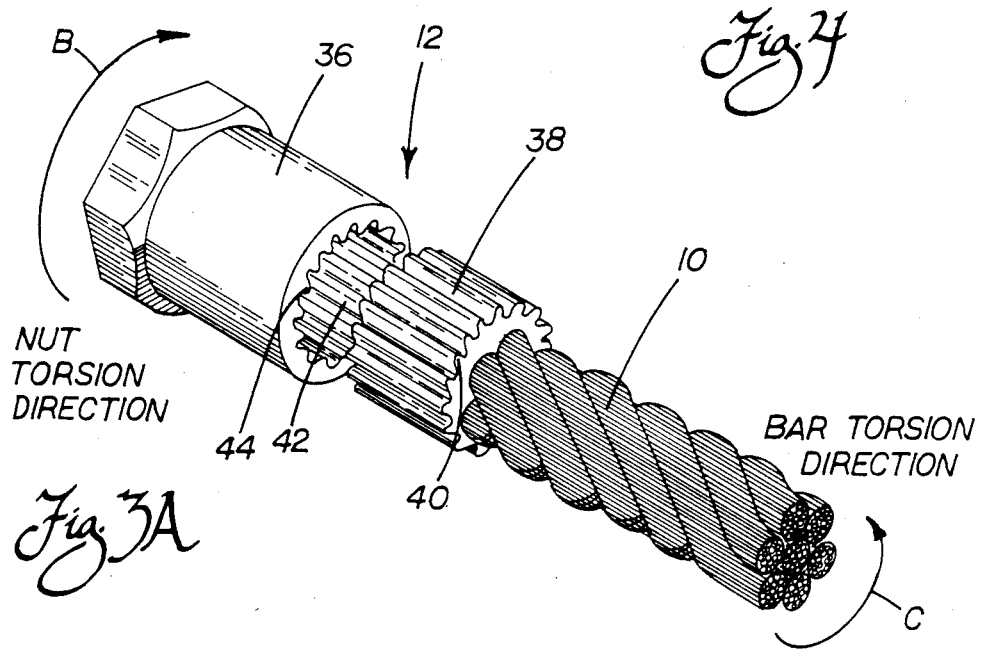

END ATTACHMENT ASSEMBLY FOR A TWISTED ROPE TORSION BAR

TECHNICAL FIELD

The present invention relates generally to an end attachment assembly for a torsion bar, and more particularly to an assembly specifically adapted for use with a torsion bar fabricated of lightweight resin coated glass fibers and formed in the shape of a twisted rope.

BACKGROUND OF THE INVENTION

Mechanical springs are widely used to serve a variety of functions, such as exerting a resilient force, providing flexibility, and storing and absorbing energy. One type of mechanical spring that has found many uses is a torsion bar.

In general, torsion bars are straight bars made of inherently resilient or elastic material, and designed to be subjected to torsional loading, i.e. twisting about its longitudinal axis. The torsion bar is usually solid and circular in cross-sectional configuration, but may also be of square or rectangular cross-section. Torsion bars have many applications; one well-known use being in automotive vehicle suspension systems.

Historically, torsion bars have been fabricated out of metal, such as steel. This provides the desired strength and durability, but does not provide the ideal resiliency due to its high modulus of elasticity. As the cost of component parts for automotive vehicles continues to rise and the need to save weight to meet governmental standards for improved gas mileage increases, the need arises to design a less expensive and lighter torsion bar. To compliment this goal, designers are continuing to create a torsion bar fabricated of a material with a low modulus of elasticity. A material found to meet the dual requirements of providing high elasticity and sufficient strength is a composite material made of resin coated glass fibers. The use of this material provides a lightweight product that is cost effective. A further advantage is that such a composite material alleviates the critical availability of metal alloys.

A problem has always existed in connecting torsion bars to any mass to be sprung due to the significant stresses existing at the connection regions. Thus, there is a need to improve the connection used in incorporating the new generation torsion bar fabricated of glass fiber/epoxy composite material into the suspension system of a vehicle. Most of the operating components of a vehicle suspension system are fabricated of metal to provide strength. It is thus anticipated that opposing ends of a torsion bar would cooperate with metal components of significant strength and mass.

It is recognized that the desirable elasticity characteristic of a torsion bar providing the amount of deflection necessary to respond to vehicle motion conflicts with the strength requirement needed for use as attachments to the vehicle suspension system. The attachment component requires a high modulus of elasticity to introduce strength to the connection. Strength is inherently reduced when a torsion bar is required to have the necessary elasticity to perform its function.

One approach used in the art involves securing a torsion bar fabricated of composite material directly to a metal mounting piece. The torsion bar normally has a tubular configuration and is fitted into a tubular socket in the anchor. This type of direct attachment produces major problems since the torsion bar fabricated of composite material tends to deflect much more than the metal mounting piece when torque is applied, resulting in the tendency for a shear failure at the attachment interface.

U.S. Pat. No. 3,856,289 to Steele discloses an attachment design between a torsion bar fabricated of fiberglass and a metal anchor attempting to remedy the problem. Two tapered elastomeric annuli in the anchor body permit angular deflection of the torsion bar relative to the anchor. This design reduces the stress concentration at the plane of entry of the torsion bar in the anchor, thus reducing the chance of failure of the torsion bar.

This attachment design favorably allows the increased use of torsion bars fabricated of composite material offering the cost and weight advantages described above. The use of elastomeric securing means between the torsion bar and the metal mounting piece greatly reduces the failure rate by reducing the stress concentration at the attachment interface. This results in turn in a greatly increased operating life. This improved situation increases the incentive to substitute more elastic and resilient torsion bars fabricated of composite material in place of metal torsion bars, decreasing the weight of the vehicle and also requiring less space in most cases.

A further improvement in the design of torsion bars for automotive vehicle suspension systems and other uses has involved using a bundle of resin coated glass fibers formed into a rod-like shape. Several rod-shaped fiber bundles are then twisted together and set in to a rope-like configuration. This produces a twisted rope torsion bar fabricated of lightweight glass fiber/epoxy composite material incorporating the benefits of increased elasticity and resilience offered by the composite material with the higher load capacity offered by the twisted rope configuration. It should be appreciated that the attachment concept disclosed in the '289 patent is not ideally suited for use with twisted rope torsion bars. The benefits offered by the elastomeric annuli of the previous design derive from the circular orientation which provides a firm grip of the torsion bar at all points of engagement. An improved attachment design is thus needed to allow the twisted rope torsion bar to optimally cooperate with a metal mounting piece and at the same time maintain the reduced stress levels at the attachment interface.

SUMMARY OF THE INVENTION

Accordingly, it is a primary object of the present invention to provide an end attachment assembly for a twisted rope torsion bar allowing harmonious interaction between the twisted rope torsion bar and a sprung mass.

It is still another object of the present invention to provide an end attachment assembly including an elastomeric bushing formulated so that it will compress radially inward with the application of increasing torque to the twisted rope torsion bar. In this way, the elastomeric bushing is influenced to grip the torsion bar tighter as increased torque is introduced.

Still another object of the present invention is to provide an end attachment assembly for a twisted rope torsion bar including an elastomeric bushing having external splines which mate with internal splines of a nut forming an anchor, both of whose splines are biased in the same direction. Advantageously, when the anchor nut is torqued in the direction of the teeth bias, the elastomeric bushing is likewise subjected to torque, producing an inward radial compression resulting in a tighter grip on the twisted rope torsion bar.

It is another object of the present invention to provide an end attachment assembly for a twisted rope torsion bar capable of being integrally molded thereto to promote tight engagement with the noncircular surface of the twisted rope torsion bar.

Another object of the present invention is to provide an end attachment assembly for a twisted rope torsion bar including an elastomeric bushing integrally molded onto the twisted rope torsion bar allowing the twisted rope torsion bar to deflect compatibly relative to the anchor nut. In this manner, the stress concentration at the plane of interface between the twisted rope torsion bar and the nut is greatly reduced minimizing the chance of torsion bar failure.

It is an additional object to provide an attachment assembly for a composite, twisted rope torsion bar that is designed to adjust compressively as the diameter of the torsion bar reduces with the application of increasing torque. Thus, a tight grip between the twisted rope torsion bar and the assembly is continuously maintained in the presence of applied torque, thereby effectively eliminating the possibility of joint failure at the attachment interface.

Additional objects, advantages and other novel features will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an end attachment assembly for a twisted rope torsion bar for use in springing a mass is provided. The end attachment assembly offers the desirable qualities of providing positive interaction between the twisted rope torsion bar and the sprung mass and stress reduction capability at the attachment interface.

Advantageously, the end attachment includes an anchor or end nut adapted to engage components of the sprung mass. Since the well-known use of a torsion bar is in an automotive vehicle suspension system, the description that follows focuses on that use. It should be appreciated, however, that the end attachment assembly can be successfully used to connect the twisted rope torsion bar for other applications.

The anchor nut of the assembly is designed to be secured to the vehicle suspension system so that it is retained in a substantially rigid position. It is this rigid engagement that allows torque to be readily transmitted to or taken from the assembly by the torsion bar.

The end attachment assembly of the present invention is contemplated as being used with a torsion bar fabricated from resin coated and twisted glass fibers. The composite material used to fabricate the torsion bar affords increased elasticity and resilience due to its low modulus of elasticity. The twisted rope orientation of the torsion bar gives a desired degree of strength to the torsion bar.

According to an important aspect of the invention, a bushing inside the anchor nut is used to provide a secure engagement with the twisted rope torsion bar. Advantageously, the bushing is fabricated of an elastomeric material. The elastic nature of the bushing is effective in providing a transition between the low modulus twisted rope torsion bar and the high modulus anchor nut. More specifically, the application of torque deflects the torsion bar much more than it does the nut. The stresses normally associated with an interface attachment between the torsion bar and the metal nut are received and dissipated by the elastomeric bushing. Thus, it is an important feature of this invention that the stress concentration at the attachment interface between the twisted rope torsion bar and the nut is greatly minimized resulting in a much longer service life of the torsion bar. Additionally, the polymeric nature of the bushing offers increased protection against frictional heat generated by the torque-influenced twisting between the torsion bar and the nut.

In accordance with a further aspect of the invention, the elastomeric bushing includes saw-toothed external splines. To cooperatively mate with these external splines, the anchor nut includes a receiving bore having internal splines inversely matching the spline profile of the bushing. This mating design allows the anchor nut to efficiently slip over the bushing in the axial direction during initial assembly. When installed in the working environment, such as in the vehicle suspension system, the torsion bar is preloaded by providing an initial twist sufficient to insure a positive spring action over the expected range of travel.

In a further effort to improve the functional relationship between the twisted rope torsion bar and the end attachment assembly, the elastomeric bushing is integrally molded onto the torsion bar. This presents a continuous and tight fit between the assembly and the torsion bar especially in view of the non-circular surface of the twisted rope torsion bar. This feature also aids in reducing potential axial slippage or movement between the torsion bar and the anchor nut.

As a further aspect of the invention, the external splines of the bushing and the internal splines of the nut are biased or cammed in one direction. As the nut is torqued in the direction of the teeth bias, the external splines of the bushing tend to ride radially inwardly along the internal splines of the anchor nut. This action not only allows torque to be transmitted to the bushing and further transmitted to the twisted rope torsion bar, but also actively compresses the bushing. It can be appreciated that the application of torque to the twisted rope torsion bar causes the diameter of the torsion bar to inherently decrease. Since the torque transmitted to the bushing causes it to be compressed radially inwardly, the bushing adequately compensates for the dimensional change of the twisted rope torsion bar and provides an even tighter grip after torque is applied. Additionally, the compression imparted to the elastomeric bushing increases its torsional shear resistance. This further increases the functional efficiency of the assembly.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and together with the description serves to explain the principles of the invention. In the drawing:

FIG. 1 is a perspective view of a twisted rope torsion bar attached at one end to a mounting block of a sprung mass and further showing at the opposite end an end attachment assembly according to this invention in full view;

FIG. 2 is a cross sectional view taken generally along the plane indicated by lines II—II in FIG. 1;

FIG. 3 is an enlarged perspective view of the end attachment assembly according to this invention in a disassembled condition;

FIG. 3A is an enlarged perspective view of the end attachment assembly according to this invention in a disassembled condition similar to FIG. 3, but shown from the opposite direction; and FIG. 4 is a side view of the torsion bar with the end attachment assemblies according to this invention at opposing ends broken away and in partial cross-section.

Reference will now be made in detail to the present preferred embodiment of the invention, an example of which is illustrated in the accompanying drawing.

DETAILED DESCRIPTION OF THE INVENTION

Reference is now made to the drawing and particularly to FIG. 1 where a twisted rope torsion bar 10 appears as a component in a system for springing a mass, such as in a vehicle suspension system. An end attachment assembly, generally designated as 12, cooperates with the torsion bar and serves to connect the torsion bar with another component of the system containing the sprung mass. The assembly 12 is shown securing the proximal end of the torsion bar 10 to a mounting block 14 having an orifice 16 that is cooperatively shaped. That is, the assembly 12 is hexagonally shaped to be retained within a hexagonal bore in the mounting block 14, thus foreclosing relative rotation between the torsion bar 10 and the mounting block 14.

The mounting block may take any suitable form, such as including upper and lower legs 18, 20 in spaced relation defining a slot 22 for cooperatively receiving a mounting web 24. A U-shaped clip 26 envelopes the mounting web 24 and assists in providing a secure engagement within the mounting block 14.

The mounting block 14 also includes a threaded aperture 32 adapted to receive a bolt 34. The force exerted by the base of the bolt 34 as the bolt 34 is threadingly tightened into the mounting block 14 provides further positive retention of the mounting web 24 within the slot 22.

The end attachment assembly 12 according to this invention is shown in the assembled condition and attached to the distal end of the twisted rope torsion bar 10 in FIG. 1. It can be appreciated that if the distal end of the torsion bar 10 is attached to a support precluding any rotational movement, the load applied to the torsion bar 10 comes only from motion associated with the mounting web 24 at the proximal end of the torsion bar 10. The loading provided by the mounting web 24 is in one direction, such as counter to the weight and normal springing action of the vehicle. Advantageously in this situation, the torsion bar 10 is preloaded in the same direction as the anticipated applied torque. More specifically, during assembly, the torsion bar 10 is twisted beyond the zero torque or relaxed position. This provides the necessary support and the spring action over the full range of anticipated travel during use.

It can be visualized that the distal end attachment assembly 12 of FIG. 1 is secured to another mounting block cooperating with a torque input means, thus imparting the torque described by action arrow A.

Reference is now made to FIGS. 3 and 3A where the preferred embodiment of the end attachment assembly 12 is more clearly shown. The end attachment assembly 12 includes an anchor or end nut 36 and a cooperating internal bushing 38. According to an important aspect of the invention, the bushing 38 is fabricated of elastomeric material. The use of elastomeric material provides a dual advantage in that it is sufficiently resilient to safely transmit torque from the substantially rigid anchor nut 36 to the torsion bar 10 while reducing the stresses that would normally build up at the interface between the high modulus nut 36 and the low modulus torsion bar 10. Additionally, the bushing 38 simultaneously aids in protecting against the frictional heat generated as a result of the twisting movement between the nut 36 and the torsion bar 10.

In order to provide a positive and optimal engagement between the end attachment assembly 12 and the twisted rope torsion bar 10, the elastomeric bushing 38 is integrally molded onto the end of the torsion bar 10. An extremely secure bond is formed between the bushing 38 and the torsion bar 10 fabricated of composite material due to the positive bonding characteristic common to both components when pressed together in the presence of sufficient heat. The bond thus formed eliminates slippage between the end attachment 12 and the torsion bar 10 during the application of the torque. The bond further aids in preventing axial motion of the torsion bar 10 away from the anchor nut 36 as the rope inherently tends to shorten when stressed.

According to a very important aspect of the invention, the elastomeric bushing 38 includes external splines 40 having a saw-toothed configuration with a strong bias or cam shape in one direction. As best shown in FIG. 3A, the nut 36 includes a bore 42 having internal splines 44 inversely matching the profile of the external splines 40 on the bushing 38. While the preferred embodiment envisions the use of saw-toothed splines, it can be appreciated that any type of cooperating cam surface arrangement performing the advantageous function may be used. This cooperating splined design between the anchor nut 36 and the bushing 38 advantageously provides a means for gripping the torsion bar more tightly when increased torque is applied to the nut 36.

More specifically, as the nut 36 is torqued in the direction of the bias of the splines 40, 44, the external splines 40 on the internal bushing 38 tend to ride radially inwardly on the internal splines 44 of the anchor nut. Torque is thus transmitted from the anchor nut 36 through the bushing 38 to the torsion bar 10, and at the same time the gripping force becomes proportionally tighter and tighter.

Referring again to FIG. 3A, one can visualize the end of torsion bar 10 not shown as being attached to a support precluding rotational motion. When torque is applied to the anchor nut 36 (as shown by action arrow B), the torsion bar 10 resists the twisting force, inducing an opposing resisting force (as shown by action arrow C). The opposing twisting force sets up a twisting moment defining the energy storage capability of the torsion bar.

It can be appreciated that the application of torque inherently tends to reduce the diameter of the twisted rope torsion bar 10. The narrowing of the torsion bar diameter along the connected surface of interface with the bushing 38 tends to impart a force trying to disrupt the bond between the two components.

The advantage provided by the cooperating spline design in conjunction with the elastomeric nature of the bushing 38 overwhelmingly counteracts the bond disruption force. More specifically, the torque imparted to the bushing 38 causes it to be compressed radially inward at the same time. This compression in response to applied torque not only compensates for the diametral change of the torsion bar 10 but also imparts a positive tighter grip on the torsion bar 10. The compressive action of the bushing 38 enhances the stress reducing characteristic which eliminates the primary cause of failure of the torsion bar 10 at the interface. The compressive action also advantageously increases the torsional shear resistance of the bushing 38 itself. The dual benefit provided by this design significantly increases the operating life of both the end attachment 12 and the torsion bar 10.

In summary, numerous benefits result from employing the concepts of the present invention. The end attachment assembly 12 employs an elastomeric bushing 38 to facilitate its connection with a twisted rope torsion bar 10. The bushing 38 is molded onto the end of the torsion bar 10 to improve the integrity of the connection. Advantageously, the bushing 38 includes external splines 40 which cooperatively match with internal splines 44 in the bore 42 of the end nut 36 to improve the security of engagement and provide a mechanism for compressing the elastomeric bushing 38 around the torsion bar 10 when increased torque is applied. The improved design provides a tighter elastic connection between the high modulus end nut 36 and the low modulus torsion bar 10 so that stress concentrations do not reach the critical point at the interface and thus eliminates a significant potential cause of failure.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. An end attachment assembly in combination with a twisted rope torsion bar having a helical surface that reduces in diameter as torque is applied, comprising:
   an anchor nut connecting to a mounting means for a sprung mass, said anchor nut including a bore having internal cam splines biased strongly in only one direction relative to the twist of said twisted rope torsion bar; and
   means for attaching said anchor nut to said twisted rope torsion bar, including an internal elastomeric bushing integrally molded to an annular portion of the helical surface on one end of said twisted rope torsion bar;
   said elastomeric bushing having external cam splines biased strongly in only said one direction and mating with said internal splines of the bore of said anchor nut so as to compress said twisted rope torsion bar only when torque is applied to said anchor nut in the direction of the bias of said cam splines;
   whereby a tight grip is continuously maintained between said end attachment and said twisted rope torsion bar to reduce the stress concentration at the attachment helical surface interface as the diameter reduces and prevent separation of said attachment assembly from said torsion bar.

2. An end attachment assembly as set forth in claim 1 wherein said cam splines have a saw-tooth configuration.

3. An end attachment assembly as set forth in claim 1 wherein said anchor nut has a high modulus of elasticity and said twisted rope torsion bar has a low modulus of elasticity.

* * * * *